Jan. 3, 1967   B. LEVENETZ   3,295,558

FILAMENT WOUND STRUCTURE

Filed June 1, 1964

INVENTOR.
BORIS LEVENETZ

BY Lyon & Lyon

ATTORNEYS

United States Patent Office 3,295,558
Patented Jan. 3, 1967

3,295,558
FILAMENT WOUND STRUCTURE
Boris Levenetz, San Diego, Calif., assignor to Whittaker Corporation, Los Angeles, Calif., a corporation of California
Filed June 1, 1964, Ser. No. 371,539
5 Claims. (Cl. 138—140)

This invention relates to a structure capable of withstanding large external pressures and more particularly relates to a filament wound structure that is capable of resisting large compressive forces and a method for making the same.

Filament wound components or structures have limited compressive strength because of the weakness of the resin which joints the fibers. The fibers usually buckle after failure of the resin. If this local buckling could be prevented, a much higher strength of the composite structure could be obtained.

It is therefore an object of the present invention to provide a filament wound structure having a greater compressive strength than those heretofore obtainable.

It is also an object of the present invention to provide such a structure in which the individual fiber wound components are reinforced to prevent or delay their buckling.

It is another object of the present invention to provide such a structure in which bundles of large diameter fibers are surrounded by thin filaments wound over the fiber bundle in a circumferential or helical pattern.

It is a further object of the present invention to provide a method of making such a structure.

These and other objects and advantages of the present invention will become more apparent upon reference to the accompanying description and drawings in which.

According to the present invention, a filament wound structure is provided that has a much greater compressive strength than those previously known. This greater strength is supplied to the structure by forming its component parts of bundles of large diameter fibers, wires or roving in a resin matrix, the bundles being surrounded and reinforced by thin filaments, wires or roving wound over the bundle in a circumferential or helical pattern. Under compressive loads the fibers are prevented from buckling by the surrounding filament and therefore the whole bundle acts as a column. As illustrated, the invention is described in connection with a cylinder that could be used as a portion of the hull of an underwater vehicle. It should be understood, however, that the teachings of the present invention may be used in forming a structure of any desired shape for any similar purpose.

Turning now to FIGURES 1 through 5, the structure 10 is seen to be constructed of a plurality of inner rings 12, a plurality of longitudinal members or staves 14 positioned around the rings 12, and an outer wrapping 16 completely overlying the staves 14.

Figure 1:
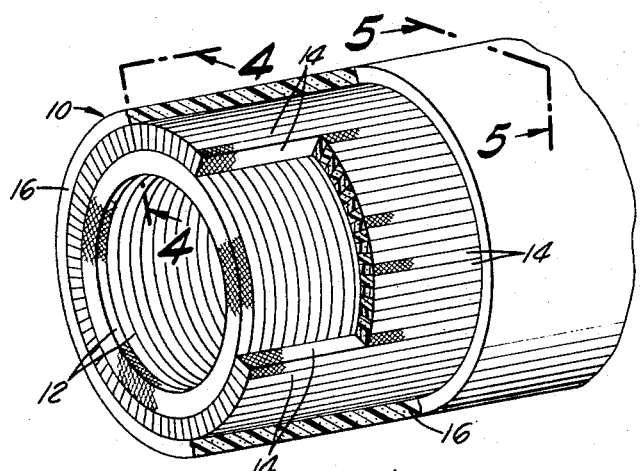
FIGURE 1 is a perspective view, partly broken away and partly in section, of a structure made in accordance with the present invention.
Figure 2:
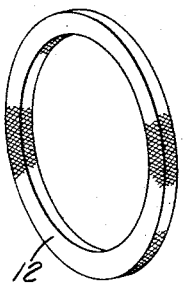
FIGURES 2 and 3 show elements utilized in constructing the structure of FIGURE 1.
Figure 3:
Figure 4:
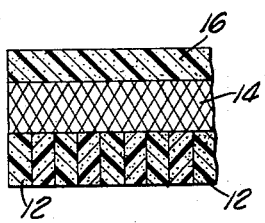
FIGURE 4 is a cross sectional view taken along lines 4—4 of FIGURE 1.
Figure 5:
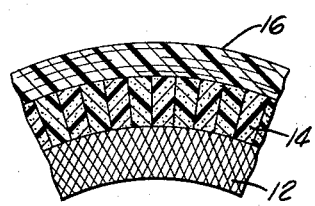
FIGURE 5 is a cross sectional view taken along lines 5—5 of FIGURE 1.
Figure 6:
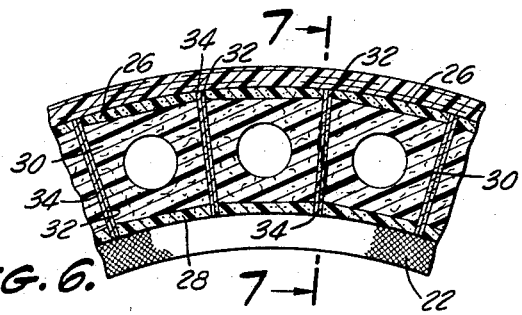
FIGURE 6 is a cross sectional view of a modification of the structure shown in FIGURE 1.

The cylindrical structure of FIGURE 1 is constructed as follows. The rings 12 are wound on a circular mandrel from circumferentially oriented large diameter fibers, such as 0.005 inch diameter of the mono-filament, from glass known as E-glass or S-glass. Metal or ceramic wires can also be used for this purpose. The term "fiber" as used in the specification and claims is therefore intended to include all such equivalent materials. The fibers are impregnated with a suitable polymer such as epoxy, phenolic or polyester resin and cured. The rings can be wound separately or they may be wound in the form of a cylinder and then cut into rings of the desired thickness.

After the cure, the rings are transversely overwound with standard glass roving, such as 0.00038 inch diameter of the mono-filament, and impregnated with the resin. Thin metal or ceramic wires could be used in place of glass if desired. The term "filament" as used in the specification and claims is therefore intended to include all such equivalent materials. It has been found that the best interlaminar shear strength is obtained when the orientation of the overwound filament is at 45 degrees to the orientation of the ring fibers. The required number of rings are then positioned about a common axis and cured under axial pressure to form a cylindrical body, after which the outer diameter may be machined.

The longitudinal staves are made in a similar manner, except that the large diameter fibers are not wound on a circular mandrel but are molded by conventional methods in straight or shaped columns and then overwound, again preferably with the overwound filament oriented at 45 degrees with the large diameter fibers. The staves are then assembled around the cylinder and the assembly cured to bond the staves to the cylinder. After the cure is completed, the outer surface of the staves may be machined. The outer wrapping 16 is then applied to the cylinder by a conventional filament winding operation using large diameter fibers and epoxy or other resin and then cured. The resulting structure can withstand quite large compressive forces as each of the rings and each of the staves is reinforced to prevent its buckling.

Figure 8:
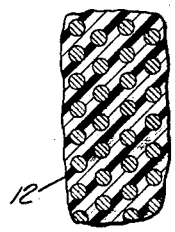
FIGURE 8 is a fragmentary detail of one of the rings used in the present invention.
Figure 7:
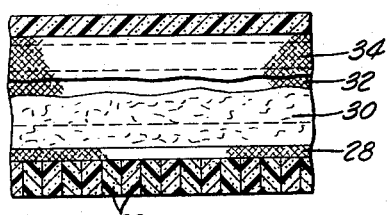
FIGURE 7 is a cross sectional view taken along lines 7—7 of FIGURE 6.

FIGURES 7 and 8 show a modification of the structure of FIGURE 1 in which the teachings of the present invention are used in connection with a sandwich construction to increase the overall wall stiffness by increasing the distance between the inner and outer fibers by means of a lightweight core. In this embodiment, the central rings 22 are similar to the rings 12 of the structure of FIGURE 1. The staves 14 of FIGURE 1 are replaced by two longitudinal plates 26 and 28 separated by a lightweight cellular core 30 and two further longitudinal plates 32 and 34 placed in a radial direction.

Each of the plates 26, 28, 32 and 34 are constructed of large diameter fibers and may be overwound in the same manner as were the staves 14 and bonded to the core 30. The core 30 may be a honeycomb plastic or metal core, cellular foam, filled resin, balsa wood, or any other material which is lightweight but capable of transferring adequately the compressive loads and increasing the compressive stability of the structural panels.

The structure shown in FIGURES 7 and 8 is made using the same sequence of steps as was described in connection with FIGURE 1. The rings 22 are wound, cured and overwound and then assembled and cured to form a cylindrical body. The staves formed of the longitudinal members and the core are then positioned about the cylindrical body and the whole assembly then cured to bond the staves together and to the cylinder. The whole structure is then overwound with the outer wrappings or shell.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A structure comprising a plurality of rings, each of said rings formed of a plurality of circumferentially oriented relatively large diameter fibers bonded together and overwound with a relatively small diameter filament oriented transversely to said fibers, said rings being positioned about a common axis and bonded together, a plurality of longitudinal members bonded to said rings and a filament wound outer wrapping overlying said longitudinal members.

2. A structure comprising a plurality of rings, each of said rings formed of a plurality of circumferentially oriented relatively large diameter fibers bonded together and overwound with a relatively small diameter filament oriented transversely to said fibers, said rings being positioned about a common axis and bonded together, a plurality of longitudinal members bonded to said rings and aligned with the common axis thereof, each of said longitudinal members including a plurality of longitudinally oriented relatively large diameter fibers bonded together and overwound with a relatively small diameter filament oriented transversely to said fibers, and a filament wound outer wrapping positioned about said longitudinal members.

3. A structure comprising a cylindrical body portion, said body portion including a plurality of rings positioned about a common axis and bonded together, each of said rings including a plurality of circumferentially oriented relatively large diameter fibers bonded together and overwound with a relatively small diameter filament oriented transversely of said fibers, a plurality of longitudinal members bonded to the outer surface of said cylinder and aligned with the axis thereof, each of said longitudinal members including a plurality of longitudinally oriented relatively large diameter fibers bonded together and overwound with a relatively small diameter filament oriented transversely to said fibers, and a filament wound outer wrapping disposed on and bonded to said longitudinal members.

4. The structure of claim 3 wherein said relatively small diameter filament is oriented at approximately 45° with said relatively large diameter fibers.

5. A structure comprising a cylindrical body portion, said body portion including a plurality of rings positioned about a common axis and bonded together, each of said rings including a plurality of circumferentially oriented relatively large diameter fibers bonded together and overwound with a relatively small diameter filament oriented transversely of said fibers, a plurality of longitudinal members bonded to the outer surface of said cylinder and aligned with the axis thereof, each of said longitudinal members including a cellular core, a plurality of longitudinal plates surrounding said core, each of said plates comprising a plurality of longitudinally oriented relatively large diameter fibers bonded together and overwound with a relatively small diameter filament oriented transversely to said fibers, and a filament wound outer wrapping disposed on and bonded to said longitudinal members.

References Cited by the Examiner
UNITED STATES PATENTS

| | | | |
|---|---|---|---|
| 752,474 | 2/1904 | Semple | 138—144 X |
| 2,552,599 | 5/1951 | Stout | 138—140 |
| 2,862,524 | 12/1958 | Smith | 138—144 |
| 3,002,534 | 10/1961 | Noland | 138—144 X |
| 3,013,584 | 12/1961 | Reed et al. | 138—145 |
| 3,071,162 | 1/1963 | Mick | 138—140 |
| 3,135,297 | 6/1964 | Nordberg et al. | 138—144 |

LAVERNE D. GEIGER, *Primary Examiner.*

SAMUEL ROTHBERG, *Examiner.*

H. S. BELL, *Assistant Examiner.*